US012077907B2

(12) United States Patent
Cazarez Duarte et al.

(10) Patent No.: US 12,077,907 B2
(45) Date of Patent: Sep. 3, 2024

(54) PROCESS FOR THE ELABORATION OF A FORMULATION BASED ON POLYURETHANE AND THE MUCILAGE OF *OPUNTIA FICUS-INDICA* WITH APPLICATIONS IN THE MANUFACTURING OF SYNTHETIC SKIN-LIKE FLEXIBLE COATINGS

(71) Applicants: Marte Arturo Cazarez Duarte, Guadalajara (MX); Adrian Lopez Arriaga Lopez Velarde, Guadalajara (MX)

(72) Inventors: Marte Arturo Cazarez Duarte, Guadalajara (MX); Adrian Lopez Arriaga Lopez Velarde, Guadalajara (MX)

(73) Assignee: ADRIANO DI MARTI S.A. DE C.V., Jalisco (MX)

( * ) Notice: Subject to any disclaimer, the term of this patent is extended or adjusted under 35 U.S.C. 154(b) by 432 days.

(21) Appl. No.: 17/432,873

(22) PCT Filed: Jul. 9, 2020

(86) PCT No.: PCT/MX2020/050016
§ 371 (c)(1),
(2) Date: Aug. 20, 2021

(87) PCT Pub. No.: WO2021/010813
PCT Pub. Date: Jan. 21, 2021

(65) Prior Publication Data
US 2022/0098789 A1 Mar. 31, 2022

(30) Foreign Application Priority Data
Jul. 12, 2019 (MX) .................. MX/A/2019/008367

(51) Int. Cl.
*D06P 5/00* (2006.01)
*C09D 105/00* (2006.01)
*C09D 175/04* (2006.01)
*D06P 1/50* (2006.01)
*D06P 1/52* (2006.01)
*D06P 3/52* (2006.01)
*D06P 3/60* (2006.01)
*D06P 3/82* (2006.01)
*D06P 5/28* (2006.01)

(52) U.S. Cl.
CPC ............ *D06P 5/004* (2013.01); *C09D 105/00* (2013.01); *C09D 175/04* (2013.01); *D06P 1/50* (2013.01); *D06P 1/5285* (2013.01); *D06P 3/52* (2013.01); *D06P 3/60* (2013.01); *D06P 3/8223* (2013.01)

(58) Field of Classification Search
CPC .......... D06P 5/004; D06P 1/50; D06P 1/5285; D06P 3/52; D06P 3/60; D06P 3/8223; C09D 105/00; C09D 175/04
See application file for complete search history.

(56) References Cited

U.S. PATENT DOCUMENTS 9,555,392 B2 † 1/2017 Thomas
10,857,193 B2 † 12/2020 Pischel
2004/0091557 A1 5/2004 Hamann

FOREIGN PATENT DOCUMENTS

| CN | 105271925 A | 1/2016 | |
| CN | 105442342 A | 3/2016 | |
| JP | 200305789 A | * 10/2003 | |
| JP | 2003305789 A | 10/2003 | |
| KR | 20090092504 | * 9/2009 | ........... C09D 175/04 |
| KR | 1020090092504 A | 9/2009 | |
| WO | 2013105841 A1 | 7/2013 | |

OTHER PUBLICATIONS

A. De Vecchi. Evaluation and Application of Opuntia Ficus-Indica Panel. First International Conference on Bio-BAsed Building MAterials. Jun. 22-24, 2015.*
International Preliminary Report on Patentability in PCT/MX2020/050016, WIPO, Jan. 18, 2022.
A. De Vecchi et al., Evaluation and Application of Opuntia Fiscus-Indicia Panel, Jun. 22-24, 2015, pp. 460-466, First International Conference on Bio-basd Building Materials, Clermon-Ferran, France.
M. Ozgur Seydibeyoglu et al., Novel Nanocomposites Based on Polyurethane and Micro Fibrillated Cellulose, Composites Science and Technology, Elsevier, 2008, 68 (3-4), pp. 908.
Adriana Cardenas et al., On the Possible Role of Opuntia fiscus-indica Mucilage in Lime Mortar Performance in the Protection of Historical Buildings, Journal of the Professional Association for Cactus Development, Jan. 1998, pp. 9.
Notification Concerning Transmittal of International Preliminary Report of Patentability (Chapter I of the Patent Cooperation Treaty), in PCT/MX2020/050016, WIPO, Jan. 18, 2022.
Office Action dated Feb. 13, 2024 in Japanese Patent Application No. 2022-502034.

* cited by examiner
† cited by third party

*Primary Examiner* — Amina S Khan
(74) *Attorney, Agent, or Firm* — Procopio, Cory, Hargreaves & Savitch LLP

(57) ABSTRACT

A process for preparing a skin-like flexible coating on a textile is described comprising preparing an *Opuntia ficus-indica* powder; creating a homogeneous mixture by mixing liquid polyurethane, pigments and additives; reducing the rate of mixing and adding the *Opuntia ficus-indica* powder to the homogeneous mixture; using a formulation based on the polyurethane and *Opuntia ficus-indica* homogeneous mixture as a skin-like flexible coating on the textile.

4 Claims, No Drawings

PROCESS FOR THE ELABORATION OF A FORMULATION BASED ON POLYURETHANE AND THE MUCILAGE OF *OPUNTIA FICUS-INDICA* WITH APPLICATIONS IN THE MANUFACTURING OF SYNTHETIC SKIN-LIKE FLEXIBLE COATINGS

FIELD OF INVENTION

The present invention refers to a process for the elaboration of a formulation based on polyurethane and the mucilage of *Opuntia ficus-indica* with applications in the manufacturing of synthetic skin-like flexible coatings, in combination with textile substrates such as polyester, cotton, polyester and cotton 10 or either with polymers such as PVC, polyurethane, among others, independently of whether it is water-based or oil-based, so that the warp of the substrate allows the generation of rolls of the coating for multiple uses and applications such as tapestry, book covers or as a substitute of covering coatings for different objects that require a coating providing an external protection; this 15 formulation has multiple applications since it has the advantage of being biodegradable and it lowers the use of contaminating plastics that contaminate the environment; despite using chemical and biological compounds such as *Opuntia ficus-indica*, the process is characterized by the use of machinery and systems that are predominantly mechanical, for which it is considered to be an invention 20 of such kind.

BACKGROUND

The use of cactaceae plants belonging to the *Opuntia ficus-indica*, has been the preference principally in the food industry due to the benefits obtained with disease treatment, being the most common ones 25 diabetes, osteoporosis, lowering of cholesterol, natural antibiotic, gastrointestinal problems, colon cleansing, obesity treatment and, in some early stages of cancer principally; these plants are quite resistant to plagues and diseases but, on occasion, they can be attacked by cochineal, when there is an excess of water fungal diseases will appear 30 principally on the plant.

Some patents where the mucilage of *Opuntia ficus-indica* is not used are the following: Patent number WO2013105841A1 that consists of a 5 method for producing silage containing cactus and argan-tree by-products, in which the silage is prepared by grinding cactus waste <something missing here> the process to obtain a silage based on cactus products and products derived from the argan tree, characterized by the fact that it comprises the following preparation steps:
  a) Completely grind the pieces of cactus fruit (1) to obtain a ground material (2) that contains the peels, pulp and seeds of the fruits;
  b) separating the ground material (2) seeds of the fruit (3) and mash (4) peels and pulp of the cactus fruit.
  c) Add to the paste (4) die (5) consisting of a mineral and vitamin compound, urea and wheat bran to obtain a first mixture (6);
  d) Add the mixture (6) argan pulp (7), the argan cake (8) and the cut straw (9) to obtain a second mixture (10);
  e) homogenize and knead the mixture (10) and apply a lactic fermentation (1 1) to obtain a silage (12); and
  f) Mix the silage (12) with a corrective agent (13) to obtain a complete and balanced feed (14) to dispense to the animals in production.

In a way such that a material grounded and separated from the seeds of the ground material is used to obtain a mash of peel and pulp without seeds. The mash is then combined with a mixture composed of urea, mineral salts and wheat 25 bran to obtain a first mixture. This last one is combined with ground argan pulp, argan flour and ground straw to obtain a second mixture, that is anaerobically preserved and it is subjected to lactic fermentation. After a preservation period of two to three weeks, the silage is produced and from here on it is used as a silage formulation for ruminant animals 30 in production, basic products of subcactus and argan products. These subproducts that contain, separately, important nutritional benefits are still undervalued in animal feeding. Nobody thought that protein subproducts associated to argan energy mince the cactus in a good nutritious food. This association is particularly beneficial since researchers found omega 3 fatty acids in the cactus of goat meat (Vasta et al., 2008; Abidi et 5 al., 2009; Atti et al., 2006) and also in animals fed with Products from the argan tree (Holland et al., 2008). Nevertheless, the uses proposed in this document are substantially different.

U.S. Pat. No. 7,455,863B2 denominated flexible elastomer articles and methods of manufacturing, in which a material, a botanical extract, is incorporated, into an elastomer emulsion, solution and/or plastisol to improve the physical and therapeutic properties of the articles made from these materials. In another aspect, the invention refers to coating of surfaces of flexible elastomer articles with a mucus polysaccharide or a non-Aloe vera mucinous botanical that is fortified with known additives to 15 protect, restore and moisturize the skin or the mucosa of mammals and to improve the ease of application or donnability of the item.

The flexible elastomer articles include gloves and other single or multiple layer flexible elastomer articles. Specifically, it is about a flexible glove that comprises at least one layer of an elastomer 20 and having a surface in contact with the user and a distal surface arranged distal to the surface in contact with the user and a coating material of Nopal that contains Nopal and free of Aloe Vera, applied to the surface in contact with the user or both to the surface in contact with the user and the distal surface; this product is very different to the invention.

25 Other uses for the plant's mucilage is in cosmetics such as patents WO2013040389A1, U.S. Pat. No. 9,163,374B2, WO2017027603A1 among others that have used the mucilage in this industrial sector.

However, there are jobs to perform scalding and utilization of *Opuntia ficus-indica* such as the so-called scalding effect and the use of chitosan over the 30 frozen nopal's quality (*opuntia ficus-indica*), of the Research Center for Food and Development, that divulge that nopal cladodes are a special vegetable, known under the name nopalitos, is part of the daily food in countries like Mexico. There are many ways to consume it and, on many occasions, it serves to control certain metabolic alterations such as diabetes, obesity and cholesterol. However, it has been 5 reported that this product's quality is affected by the enzymatic browning, specifically produced by polyphenol oxidase and the secretion of mucilage, caused principally by cutting of the stalk. In this work the goal was to minimize changes in the quality of the frozen nopal using scalding and different concentrations of chitosan. This is because 10 scalding is one of the steps of freezing and of other processes with which the stabilization of vegetable product quality is achieved, mainly due to enzymatic inactivation and the reduction of the microbial load. On the other side, in the last decades, the use of chitosan has become more generalized in many areas such as the food industry and regarding its uses in vegetable food technology its uses as protecting film, antimicrobial agent, and even as a reducer of enzymatic activity in whole fruits make it a potential nopal quality preservative agent. In this work, the effect of scalding time at 70° C. (TE) and the chitosan concentration (CQ) (0.0, 0.1, 0.2, 0.3% p/v) in nopal quality were evaluated immediately after scalding and during its storage at −20° C. for 6 months. The quality parameters that did not show a significant effect (p>0.05), at the beginning of the experiment were: pH, L* value and b* value. The variables affected by the treatments (p<0.05) in this same stage of the work were: titratable acidity (%), total soluble solids ($°Brix$), drainage volume (mL), texture (N), a* value and polyphenol oxidase (PPO) and peroxidase (POD) enzymatic activities. In general, most of the analyzed variables showed an increased in relation to the utilized raw material. The titratable acidity showed increases in a 0.75 to 0.9% range due to the addition of chitosan. Regarding total soluble solids, an increment of 2 to 2.5° Brix was observed, due to the increase in the scaling time and the chitosan concentration. Texture behavior was similar and its range was between 2.8 to 3.4 N; but in this invention scalding is not required and much less freezing.

Having sufficiently described my invention, I hereby declare that it is novel and thus, I claim exclusive rights over the content in the following claims:

1. A process for preparing a skin-like flexible coating on a textile, comprising:
    preparing an *Opuntia ficus-indica* powder by
        collecting cladodes between 1.5 and 2.5 years old;
        preparing a solution of potable water, cupric hydroxide and chlorine in a container;
        pouring the cladodes in the container with the solution;
        removing impurities and spines of the cladodes from the solution;
        triturating the cladodes into fragments and dehydrating the fragments into chunks of dehydrated chunks of cladodes; and
    pulverizing the chunks of dehydrated cladodes to a size from 0.149 mm to 0.177 mm of *Opuntia ficus-indica* powder;
    separating coarse particles from the powder so as to produce fine particles between 0.140 mm to 0.150 mm;
    passing the fine particles through a magnetic field, eliminating ferric impurities;
    creating a homogeneous mixture by mixing liquid polyurethane, pigments and additives at a rate of mixing;
    reducing the rate of mixing and adding the *Opuntia ficus-indica* powder to the homogeneous mixture;
    using a formulation based on the polyurethane and *Opuntia ficus-indica* homogeneous mixture as a skin-like flexible coating on the textile.

2. The process of claim 1, further comprising using the formulation based on the polyurethane and *Opuntia ficus-indica* homogeneous mixture for the sublimation of textile garments.

3. The process of claim 1, further comprising placing the formulation based on the polyurethane and *Opuntia ficus-indica* homogeneous mixture over a textile band that serves as first substrate and is impregnated at least on one side, drying the formulation, iteratively applying the formulation until a coating is formed to using the coating as a final substrate of one or more of tapestries, covers, and table covers.

4. The process of claim 1, further comprising placing the formulation based on the polyurethane and *Opuntia ficus-indica* homogeneous mixture over a textile band that serves as first substrate and is impregnated at least on one side, drying the formulation, iteratively applying the formulation in the manufacturing of shoes or plaques of material until a coating that serves as a biodegradable synthetic skin is formed.

* * * * *